United States Patent
Coss, Jr. et al.

(10) Patent No.: US 6,763,278 B1
(45) Date of Patent: Jul. 13, 2004

(54) OPERATING A PROCESSING TOOL IN A DEGRADED MODE UPON DETECTING A FAULT

(75) Inventors: Elfido Coss, Jr., Austin, TX (US); Michael R. Conboy, Austin, TX (US); Sam H. Allen, Jr., New Braunfels, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 156 days.

(21) Appl. No.: 10/133,045

(22) Filed: Apr. 26, 2002

(51) Int. Cl.[7] .............................................. G06F 19/00
(52) U.S. Cl. ........................ 700/108; 700/121; 702/183
(58) Field of Search .............................. 700/108, 121; 702/183–185

(56) References Cited

U.S. PATENT DOCUMENTS

| | | | | |
|---|---|---|---|---|
| 5,027,293 A | * | 6/1991 | Pung et al. ................. | 702/185 |
| 5,251,144 A | * | 10/1993 | Ramamurthi ................ | 700/177 |
| 5,596,716 A | * | 1/1997 | Byers et al. .................. | 714/48 |
| 5,859,964 A | * | 1/1999 | Wang et al. .................. | 714/48 |
| 6,157,866 A | * | 12/2000 | Conboy et al. ............. | 700/121 |
| 6,335,286 B1 | * | 1/2002 | Lansford ..................... | 438/692 |
| 6,378,067 B1 | * | 4/2002 | Golliver et al. ............. | 712/244 |
| 6,556,939 B1 | * | 4/2003 | Wegerich .................... | 702/127 |
| 6,618,825 B1 | * | 9/2003 | Shaw ........................... | 714/55 |
| 2002/0055801 A1 | * | 5/2002 | Reiss et al. ................. | 700/111 |
| 2002/0065572 A1 | * | 5/2002 | Ina et al. ...................... | 700/96 |
| 2003/0014145 A1 | * | 1/2003 | Reiss et al. ................. | 700/121 |

* cited by examiner

*Primary Examiner*—Leo Picard
*Assistant Examiner*—Elliot L Frank
(74) *Attorney, Agent, or Firm*—Williams, Morgan & Amerson, P.C.

(57) ABSTRACT

A method and apparatus is provided for operating a processing tool in a degraded mode upon detecting a fault and in accordance with one or more business rules. The method comprises detecting a fault associated with a processing tool capable of processing one or more workpieces and operating the processing tool in a degraded mode in response to detecting the fault.

30 Claims, 5 Drawing Sheets

OPERATING A PROCESSING TOOL IN A DEGRADED MODE UPON DETECTING A FAULT

BACKGROUND OF THE INVENTION

1. Field of the Invention

This invention relates generally to a semiconductor fabrication process, and, more particularly, to operating a processing tool in a degraded mode in the semiconductor fabrication process upon detecting a fault associated with the processing tool.

2. Description of the Related Art

There is a constant drive in the semiconductor industry to increase the quality, reliability, and throughput of integrated circuit devices such as microprocessors, memory devices and the like. This drive is fueled by consumer demands for higher quality computers and electronic devices that operate more reliably.

These demands by the consumer have resulted in some improvements in the manufacture of semiconductor devices as well as in the manufacture of integrated circuit devices incorporating such semiconductor devices. Reducing the defects in the manufacture of these devices lowers the cost of the devices themselves. Accordingly, the cost of the final product incorporating these devices is also reduced, thus providing inherent monetary benefits to both the consumer and manufacturer.

Generally, a set of processing steps is performed on a group of wafers, sometimes referred to as a "lot," using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, while such tools may expeditiously and somewhat accurately identify faults, these processing tools often lack the ability to adequately respond to faults.

Typically, when a fault in a processing tool is detected, that processing tool is shut down until some corrective action may be taken to remove the cause of the fault. Shutting down the processing tool, however, adversely affects the overall efficiency of the semiconductor manufacturing process as the progress is hindered during the processing tool's downtime.

The present invention is directed to overcoming, or at least reducing the affects of, one or more of the problems set forth above.

SUMMARY OF THE INVENTION

In one embodiment of the present invention, a method is provided for operating a processing tool in a degraded mode upon detecting a fault and in accordance with one or more business rules. The method comprises detecting a fault associated with a processing tool capable of processing one or more workpieces and operating the processing tool in a degraded mode in response to detecting the fault.

In another embodiment of the present invention an apparatus is provided for operating a processing tool in a degraded mode upon detecting a fault. The apparatus comprises an interface communicatively coupled to a control unit. The control unit is adapted to detect an occurrence of a fault in a processing tool capable of processing a workpiece, determine at least one function that the processing tool is capable of performing after the occurrence of the fault and indicate to the processing tool to perform the determined function.

In a further embodiment of the present invention, an article comprising one or more machine-readable storage media containing instructions is provided for operating a processing tool in a degraded mode upon detecting a fault. The one or more instructions, when executed, enable the processor to detect a fault associated with a processing tool capable of processing one or more workpieces, determine at least one function that the processing tool is capable of performing based on detected fault and cause the processing tool to perform the determined function.

BRIEF DESCRIPTION OF THE DRAWINGS

The invention may be understood by reference to the following description taken in conjunction with the accompanying drawings, in which like reference numerals identify like elements, and in which.

Figure 1:
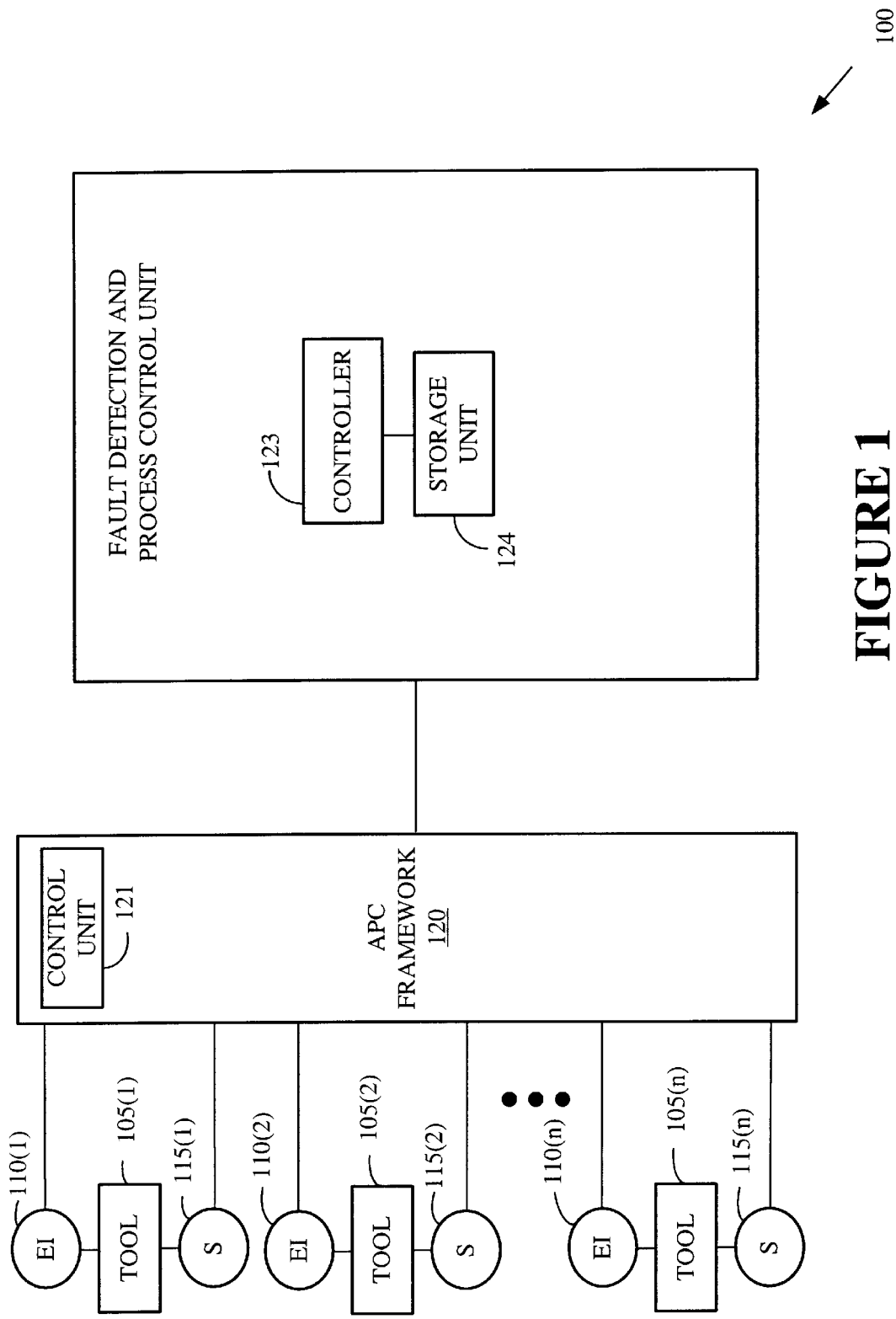
FIG. 1 illustrates a manufacturing system, including an APC framework, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a block diagram of a manufacturing system 100 for a semiconductor fabrication process is illustrated in accordance with one embodiment of the present invention. The system 100 includes a plurality of processing tools 105 (shown as tools 105(1–n) in FIG. 1). The processing tools 105 in the illustrated embodiment may be in the form of semiconductor fabrication equipment used to produce and process semiconductor material, such as silicon wafers, for example. It will be appreciated, however, that the processing tools 105 need not necessarily be limited to the production of silicon wafers, but could include other types of manufacturing equipment for producing a variety of different types of commercial products without departing from the spirit and scope of the present invention.

In one embodiment, the processing tools 105 may be downstream to each other (e.g., the second processing tool 105(2) may be downstream to the first processing tool 105(1), the third processing tool 105(3) may be downstream to the second processing tool 105(2), and so forth). As such, a semiconductor device that is processed by the first processing tool 105(1) may, for example, be provided to the second processing tool 105(2), which may further process the semiconductor device before it is processed by the next processing tool 105(3). This process may continue until the last processing tool 105(n) has completed processing the semiconductor device. In one embodiment, the processing tools 105 may include one or more chambers (not shown) where each chamber may perform any one or more of the desired processing steps.

The processing tools 105 of the system 100, in the one embodiment, may perform various processing steps to create a packaged semiconductor device. For example, the processing tools 105 may be used for manufacturing the raw semiconductor material, slicing the semiconductor crystal ingot into individual wafers, fabricating (e.g., etching, doping, ion implanting) the wafers, testing and packaging the completed semiconductor devices. The number of processing tools 105 employed in the system 100 may be implementation specific, and thus may vary from one embodiment to another depending on the particular processing steps desired.

For the purposes of this discussion, the term "processing tool" refers to a tool that is capable of performing one or more processing steps on a workpiece. The processing tool 105, in one embodiment, may include a metrology tool for providing selected measurements of workpieces or it may include test equipment. In one embodiment, each chamber of a multi-chambered processing tool 105 may represent a "processing tool."

Generally, the processing tools 105 perform selected processing steps in accordance with a recipe defined for the workpiece to be processed in the processing tool 105. In one embodiment, the processing tool 105 may have more than one recipe associated therewith. For example, a processing tool 105 may perform selected processing steps on one workpiece according to a first recipe, and other processing steps on another workpiece.

In the illustrated embodiment, the processing tools 105 are coupled to respective equipment interfaces (EI) 110 (shown as EI 110(1–n) in FIG. 1). Each of the equipment interfaces 110 retrieves various operational data from its respective processing tool 105, and communicates this data to an Advanced Process Control (APC) framework 120 to determine whether the processing tool 105 is experiencing a faulty operation. Each equipment interface 110 may further receive control signals from the APC framework 120 that may be used to control the respective processing tool 105.

For example, a control signal from the APC framework 120 may be used to shut down the first processing tool 105(1) if the operational data that was sent by the first equipment interface 110(1) was deemed faulty by the APC framework 120.

The APC framework 120 may be any one of a variety of arrangements that facilitates communications to and from the processing tools 105. In one embodiment, the APC framework 120 may include a control unit 121 that manages the communications to and from the APC framework 120. The control unit 121 may also control the overall operations of one or more of the processing tools 105.

The processing tools 105 may include one or more internal sensors for measuring operational data, which may then be transmitted through the associated EI 110 of the processing tools 105. In additional to internal sensors, the processing tools 105 may also be coupled to respective external sensors 115 (shown as sensors 115(1–n) in FIG. 1). The sensors 115 measure additional operational data that may or may not be ascertained by the associated processing tool 105 itself. For example, the sensors 115 may be used to determine a temperature range or other environmental or ambient data near or around the associated processing tool 105. In alternative embodiments, the sensors 115 may be used to sense various other operational parameters associated with the processing tool 105, and, thus, need not be limited to the aforementioned examples. It should be appreciated that, in one embodiment, the sensors 115 may also be integrated within the processing tools 105 themselves.

It should be appreciated that in one embodiment, the processing 105 may have an internal sensor to measure operational data. In one embodiment, at least a portion, if not all, of the sensor 115 may be integrated into the processing tool 105 itself.

The sensor 115 may be embodied as a simple data acquisition program, such as a C++ standalone program acquiring data from a thermocouple wire, for example. Alternatively, the sensor 115 may be embodied as a full-fledged LABVIEW application, acquiring data through multiple transducers (not shown). It will further be appreciated that the sensor 115 need not be used at all, and the APC framework 120 may rely upon the operational data forwarded from the equipment interface 110. If used, in one embodiment, the sensor 115 forwards the additional operational data to the APC framework 120 for analysis.

The system 100 includes a fault detection and process control unit 122 having a controller 123 and a storage unit 124. The fault detection and process control unit 122, in one embodiment, detects a fault associated with at least one of the processing tools 105, as described in more detail below. Upon detecting a fault in the processing tool 105, the fault detection and process control unit 122, as described below in detail, causes that processing tool 105 to operate in a degraded mode. The processing tool 105 operates in a "degraded mode" when it executes in less than a full operational mode because of fault or an error. That is, the processing tool 105 may operate in a "degraded mode" when it is capable of performing only a subset of functions that it would otherwise have been able to perform under substantially fault-free conditions. For example, assuming that a processing tool 105 has two chambers, only one of which is operational because of a fault in the other chamber, the processing tool 105 is deemed to be operating in a "degraded mode" when only one of the two chambers is being utilized. Other examples of the processing tool 105 operating in a "degraded mode" are provided below.

The fault detection and process control unit 122, which is coupled to the APC framework 120, receives the operational data of the processing tool 105 from the equipment interface 110 and/or sensor 115 via the APC framework 120. Prior to sending the operational data to the fault detection and process control unit 122, the APC framework 120 may, in one embodiment, translate the operational data to a format that is recognizable by the fault detection and process control unit 122 in a manner that is well known to those of ordinary skill in the art. In an alternative embodiment, the fault detection and process control unit 122 may be integrated into the APC framework 120, and, as such, the translation of the operational data to a format that is recognizable by the fault detection and process control unit 122 may not be necessary.

It should be appreciated that the illustrated components shown in the block diagram of the system 100 in FIG. 1 are illustrative only, and that, in alternative embodiments, additional or fewer components may be utilized without deviating from the spirit or scope of the invention. For example, in one embodiment, the one or more of the processing tools 105 may not have an associated sensor 115. Additionally, it should be noted that although various components, such as the equipment interface 110 of the system 100 of FIG. 1 are shown as stand-alone components, in alternative embodiments, such components may be integrated into the processing tool 105. Similarly, the fault detection and process control unit 122 may be integrated into the APC framework 120.

Figure 2:
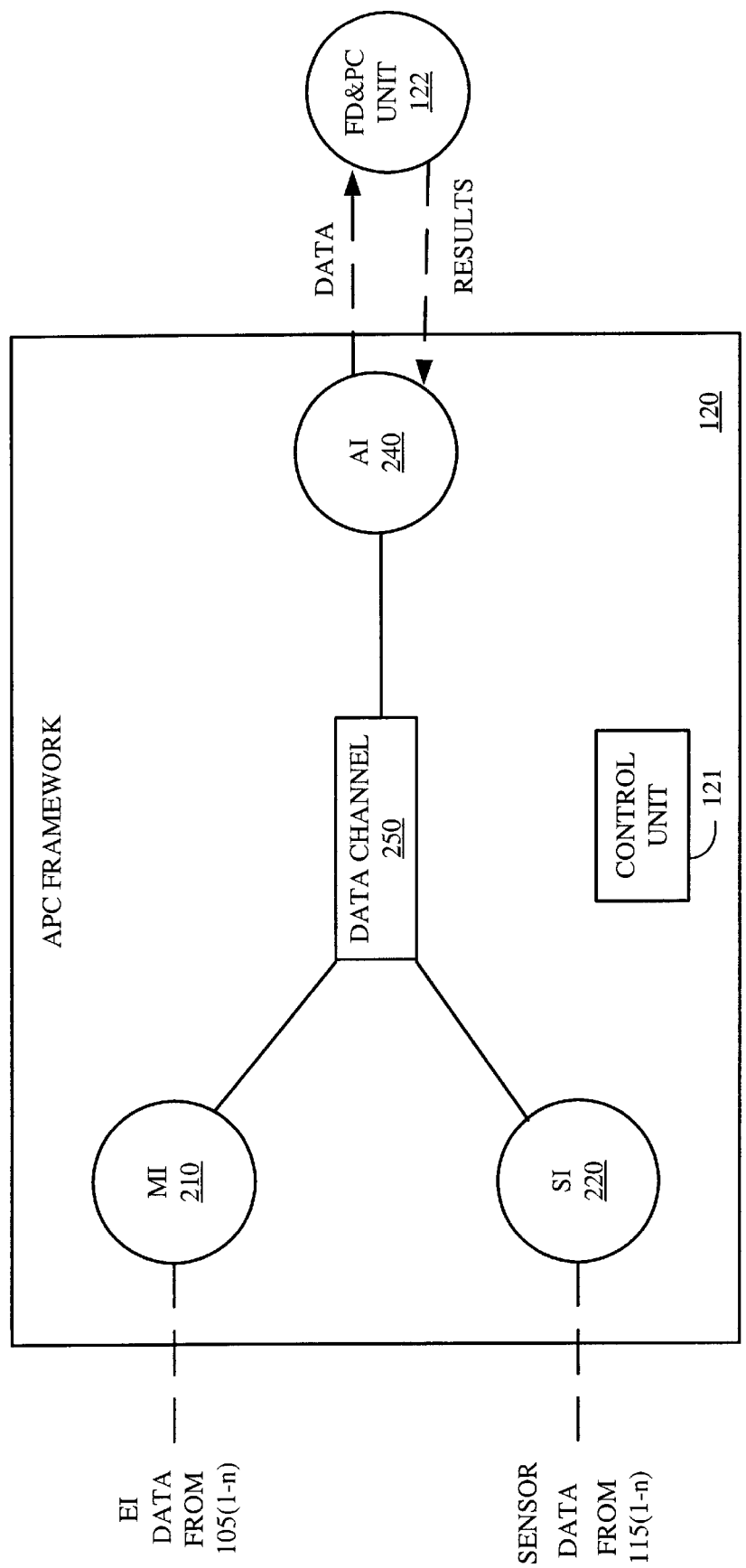
FIG. 2 illustrates a block diagram of the APC framework of FIG. 1, in accordance with one embodiment of the present invention.

Turning now to FIG. 2, a more detailed representation of the APC framework 120 is provided. The APC framework 120 is a component-based architecture comprised of interchangeable, standardized software components enabling run-to-run control and fault detection of the processing tool 105. The APC framework 120 includes a machine interface (MI) 210 for communication with the processing tool 105 and the APC framework 120 to collect operational data therefrom. The APC framework 120 further includes a sensor interface (SI) 220 for communication between the sensor 115 and the APC framework 120. The sensor interface 220 also collects operational data of the processing tool 105 through the sensor 115. The APC framework 120 further includes an applications interface (AI) 240 for interfacing with third-party applications that run on the fault detection module 125 to analyze the operational data received via the machine and sensor interfaces 210, 220. In the illustrated embodiment, the third-party application is the fault detection and process control unit 122. A data channel 250 is further provided to allow for communication of data from the machine and sensor interfaces 210, 220 and the applications interface 240 of the APC framework 120.

The machine interface (MI) 210 couples to the equipment interface 110 to serve as an interface between the processing tool 105 and the APC framework 120. The machine interface 210 supports the setup, activation, monitoring, and data collection of the processing tool 105. The machine interface 210 receives commands, status events, and collected data from the equipment interface 110 and forwards this information to other components of the APC framework 120, namely the applications interface 240. Any responses that are received by the machine interface 210 from the other components of the APC framework 120 are routed to the equipment interface 110 for delivery to the processing tool 105. As previously discussed, this may include a control signal from the fault detection and process control unit 122 (see FIG. 1) to manipulate the processing tool 105 if a faulty condition is detected.

The machine interface 210 may also reformat and restructure the messages between the specific communications protocol utilized by the equipment interface 110 and the Common Object Request Broker Architecture Interface Definition Language (CORBA IDL) communications protocol used by the components of the APC framework 120. The manner in which the machine interface 210 performs such translation between the equipment interface-specific communications protocol and the CORBA IDL protocol of the APC framework 120 is well known to those of ordinary skill in the art. Accordingly, the specific translation process between these two formats will not be discussed herein to avoid unnecessarily obscuring the present invention.

The sensor interface 220 is coupled to the sensor 115 and serves as an interface between the sensor 115 and the APC framework 120. The sensor interface 220 provides setup, activation, monitoring, and data collection for the sensor 115. Similar to the machine interface 210, the sensor interface 220 may also reformat and restructure the messages between the specific communications protocol utilized by the sensor 115 and the CORBA IDL protocol used by the components of the APC framework 120.

The applications interface 240 supports the integration of third-party tools (e.g., commercial software packages, such as ModelWare, MatLab, and Mathematica, for example) to the APC framework 120. Typically, these third-party tools do not provide the standard CORBA IDL protocol known to the APC framework 120; accordingly, the applications interface 240 provides the necessary translation between the communications protocol utilized by the third-party tool and the CORBA protocol used by the APC framework 120.

Figure 3:
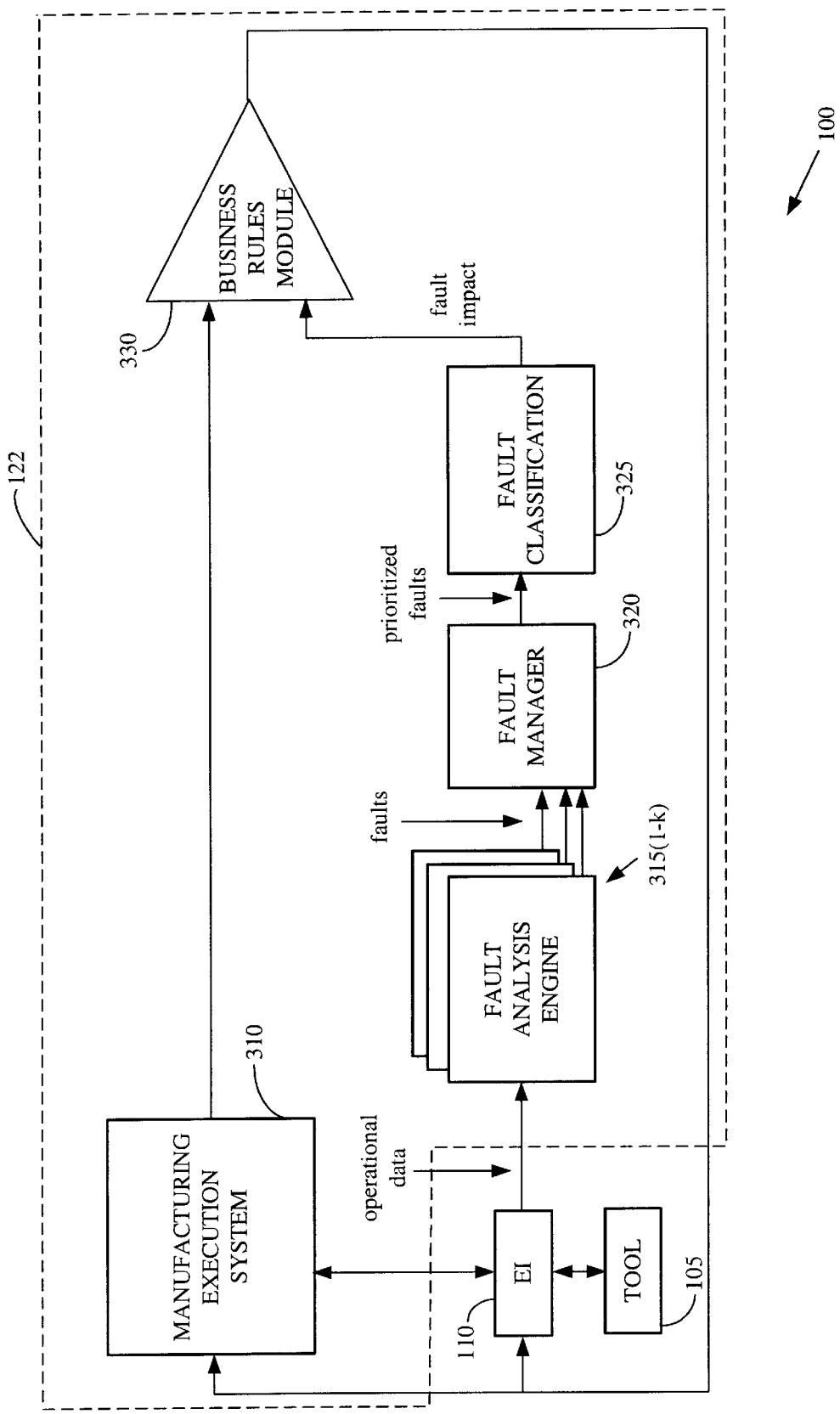
FIG. 3 depicts a block diagram of a fault detection and process control unit that may be employed by the manufacturing system of FIG. 1, in accordance with one embodiment of the present invention.

Referring now to FIG. 3, a block diagram of the fault detection and processing control unit 122 of the manufacturing system 100 of FIG. 1 is illustrated, in accordance with one embodiment of the present invention. For ease of illustration and to unnecessarily obscure one or more embodiments of the invention, the APC framework 120 is not shown in FIG. 3, although it should be appreciated that the communication between various shown elements of FIG. 3 may occur through the APC framework 120. For example, the communication to and from the processing tool 105 may occur though the APC framework 122. Similarly, other elements described in greater detail below may also communicate with each other through the APC framework 122. In an alternative embodiments, instead of the APC framework 122, one or more of the elements of FIG. 3 may communicate over a network connection or other desirable connection. It should be appreciated that of the one or more elements of the fault detection and processing control unit 122 of FIG. 3 may be implemented in software, hardware, or a combination thereof. The software may be storable in the storage unit 124 (see FIG. 1).

The fault detection and processing control unit 122, in the illustrated embodiment, includes a manufacturing execution system 310. The manufacturing execution system 310 generally manages the overall operations of the manufacturing system 100. For example, the manufacturing execution system 310 may determine what processes are performed on the workpieces, when the processes are performed, which processing tools perform, how the processes are performed, and the like. In one embodiment, the manufacturing execution system 310 controls the route the workpieces traverse through the manufacturing system 100. The manufacturing execution system 310, in one embodiment, may know the operating conditions of the processing tools 105, such as whether a particular processing tool 105 is operational or which portions of that particular processing tool 105 are not operational.

In the illustrated embodiment, the fault detection and processing control unit 122 includes one or more fault analysis engines 315 (shown as 315(1-k)) that are capable of receiving operational data from one or more of the equipment interfaces 110 (or the sensors 115) associated with the processing tools 105 and determining if a fault has occurred. In accordance with one embodiment, the fault analysis engine 315 may include a commercially available software package, such as ModelWare, for example, that provides fault detection analysis of the processing tools 105. It will be appreciated, however, that other types of commercially available fault detection software may also be used in lieu or in combination thereof without departing from the spirit and scope of the present invention.

The fault analysis engine 315, in one embodiment, compares the received operational data from the APC framework 120 to fault model data. The fault model data includes operational data of other similar-type tools, where it was previously known that such tools had operated within acceptable operational limits. The types of faults that may be detected by the fault analysis engine 315 include processing and/or operational faults in silicon wafer fabrication. Examples of processing faults may include, but are not necessarily limited to, non-optimal preheating of the chamber, catastrophic failure where a broken wafer is detected, abnormal nitrogen (N2) flow rate, temperature overshoots at the top of a ramp, tube temperature measurement drifts, etc. Examples of operational faults detected by the fault detection module 125 may include interrupted/resumed processing, no wafer sleuth or improper wafer sleuth prior to Rapid Thermal Anneal (RTA), etc. Thus, what constitutes a "fault" may vary depending upon the type of workpieces processed and the nature of the processing operation performed in the processing tool 105.

One or more of the detected faults may be provided to a fault manager module 320, which, in one embodiment, prioritizes the faults for a fault classification module 325. The fault classification module 325 generally classifies the prioritized faults based on the impact of such faults on the processing tool 105 with which that prioritized fault is associated. The fault manager module 320 may prioritize faults, in one embodiment, to reduce the number of faults that have to be classified by the fault classification module 325. For example, harmless faults, in the form of notifications or alerts, may be assigned a lower priority as compared to those that affect the operation of the processing tool 105 or a portion of the processing tool 105.

The fault classification module 325, in one embodiment, based on the prioritized fault that is provided by the fault manager module 320, determines the impact of the fault on the processing tool 105 with which that fault is associated. Accordingly, the fault classification module 325 outputs a "fault impact" signal. The "fault impact" signal, in one embodiment, may include information about one or more resources of the processing tool 105 that are inoperable or unavailable because of the occurrence of the fault. In another embodiment, the "fault impact" signal may include information about one or more of the resources of the processing tool 105 that are still available despite the occurrence of the fault. In yet another embodiment, the "fault impact" signal may include information regarding both the availability and unavailability of selected resources in the processing tool 105 after the fault occurs. Exemplary information provided by the fault classification module 325 may include that a particular chamber is down in the processing tool 105 but other selected chambers are still operable to execute selected recipes, that a particular chemical employed by the processing tool 105 is depleted, but that an alternative chemical supply is available instead, and that a temperature controller in the processing tool 105 is inoperable. Thus, the fault classification module 325 provides information regarding the degradation mode in which the processing tool 105 operates after an occurrence of a fault.

The fault detection and processing control unit 122 in the illustrated embodiment includes a business rules module 330, which controls the processing tool 105 based on inputs from the fault classification module 325 and the manufacturing execution system (MES) 310. The MES 310 in the illustrated embodiment indicates to the business rules module 330 the tasks (e.g., or objectives or processes) that need to be completed. The fault classification module 325 as mentioned, indicates availability or lack of availability (or both) of one or more of the resources of the processing tools 105 in the manufacturing system 100. Based on the tasks requiring completion (provided by the MES 310) and the availability of the resources (provided by the fault classification module 325) in the processing tool 105, the business rule module 330 determines which tasks are capable of being completed. The business rule module 330 accordingly generates a "tool action" signal to control the processing tool 105. In one embodiment, the "tool action" signal is also provided to the MES 310 to notify the MES 310 of the operating state of the processing tools 105.

The business rules module 330, in one embodiment, includes one or more business rules that prioritize the tasks provided by the manufacturing execution system 310 according to a company's business needs at that time. For example, based on the tasks provided by the MES 310, the business rule module 330 may determine that an immediate production of a particular product (e.g., a specific microprocessor model) takes precedence over other tasks. As such, based on the company's business objectives and the reduced capability of the processing tool 105 in the degraded mode, the business rule module 330 determines what process should be performed next using the limited available resources of the processing tool 105.

In one embodiment, the business rules module 330 may be implemented in the manufacture execution system 310. In alternative embodiment, the business rules module 330 may be implemented substantially independent of the manufacturing execution system 310, and may be part of standalone processing agents or planning systems.

Figure 4:
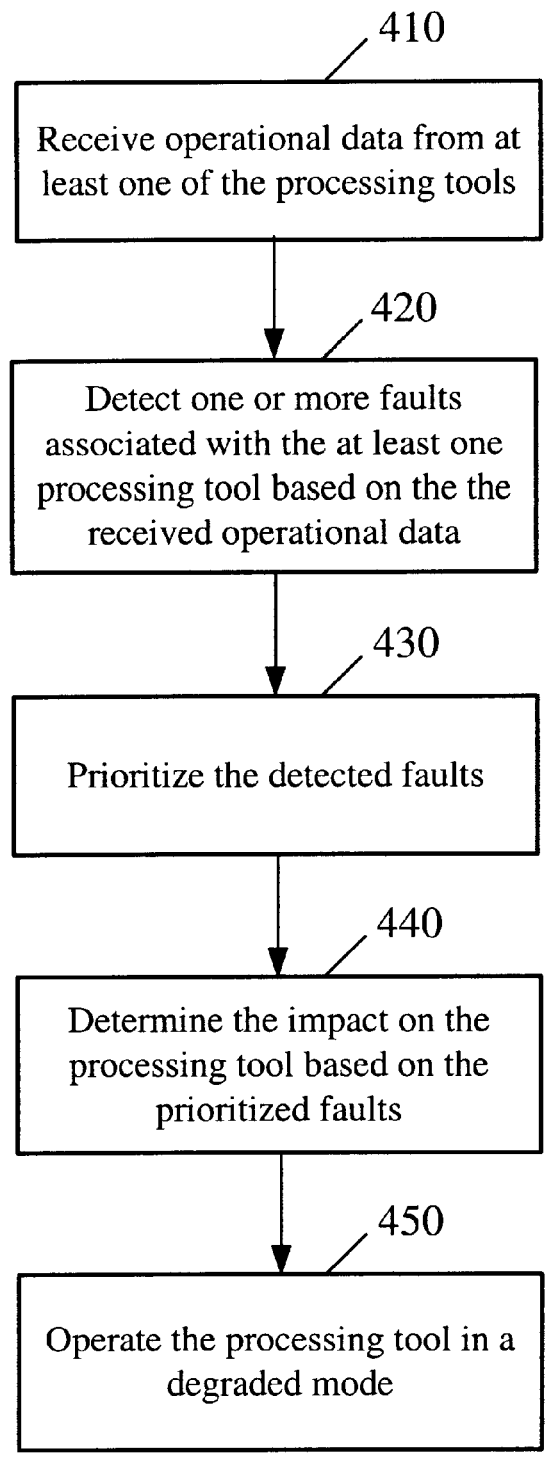
FIG. 4 illustrates a flow diagram of a method that may be implemented in the fault detection and process control unit of FIG. 3, in accordance with one embodiment of the present inventions.

Referring now to FIG. 4, a flow diagram of a method that may be implemented in the fault detection and processing control unit 122 of FIG. 3 is illustrated, in accordance with one embodiment of the present invention. For clarity and ease of illustration, the method of FIG. 4 is described in the context of the manufacturing system 100 having a single processing tool operating therein. It should, however, be appreciated that the method of FIG. 4 may also be applicable to the manufacturing system 100 having a plurality of processing tools 105 operating therein.

The fault detection and process control unit 122 receives (at 410) the operational data from the processing tool 105. One or more of the fault analysis engines 315 detect (at 420) one or more faults associated with the processing tool 105 based on the received operational data (at 410). As mentioned, the types of faults that are detected may include processing and operational faults in silicon wafer fabrication.

The fault manager 320 prioritizes (at 430) the one or more faults detected (at 420) by the fault analysis engine 315. In one embodiment, faults that affect the operation of the processing tool 105 are assigned a higher priority than those that do not. Additionally, faults that affect the operation of the processing tool 105 may further be prioritized according to the level of impact the fault has on the operation of the processing tool 105. For example, a fault indicating that a particular chamber of the processing tool 105 is inoperable may be assigned a higher priority over one that indicates, for example, that a temperature sensor of that particular inoperational chamber is not functional. It should be appreciated that in the process of prioritizing faults, the fault manager 320 may perform a portion of the step of fault classification that is performed by the fault classification module 325. In one embodiment, the fault manager 320 reduces the overall number of faults that are classified by the fault classification module 325.

The fault classification module 325, in one embodiment, determines (at 440) the impact on the operation of the processing tool 105 based on the prioritized fault. The detected faults may affect the operation of the processing tool 105 in various ways. For example, a fault may render an entire chamber of the processing tool 105 inoperable. Alternatively, a fault may partially affect the operation of a chamber because, for example, a sensor (e.g., temperature) associated with the chamber is inoperable, a cleaning mechanism associated with the chamber is inoperable, or a supply of a particular chemical is depleted. It should be appreciated that faults may affect the operation of the processing tool 105 in various other ways, depending on the nature of the fault. In one embodiment, determining (at 440) the impact on the operation of the processing tool 105 may include identifying one or more functions that the processing tool 105 is capable/or not capable of performing after the occurrence of the fault.

The fault detection and process control unit 122 operates (at 450) the processing tool 105 in a degraded mode based on determining (at 440) the impact on the processing tool 105. That is, the fault detection and process control unit 122 may use the processing tool 105 to perform functions that the processing tool 105 is capable of performing after the occurrence of the fault. It should be appreciated that the precise functions that the processing tool 105 may be capable of processing after the fault may depend on the type of processing tool 105 being employed and the nature of the fault. The act of operating (at 450) the processing tool 105 in a degraded mode is illustrated in FIG. 5, in accordance with one embodiment of the present invention.

Figure 5:
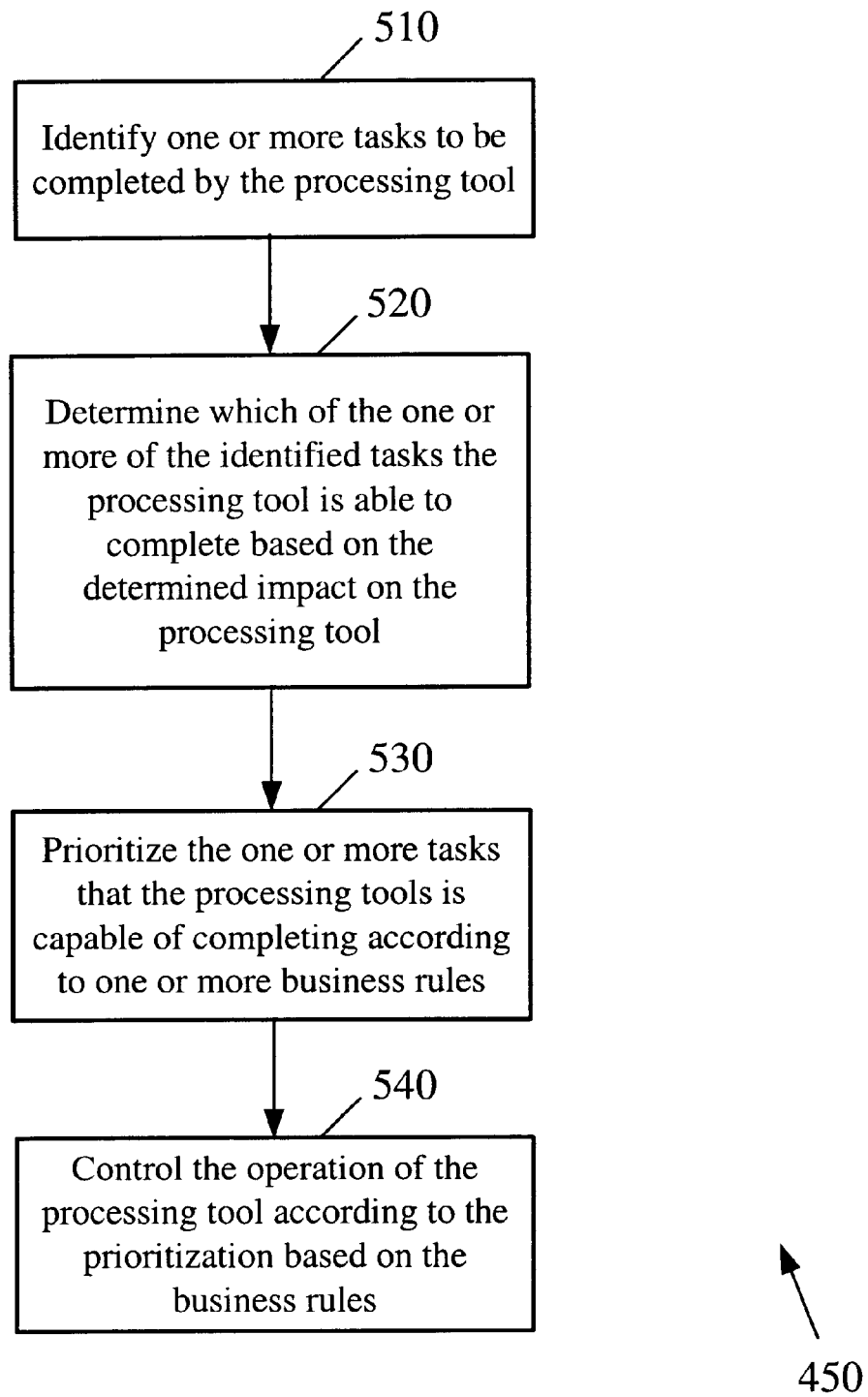
FIG. 5 illustrates a flow diagram of a method that may be implemented in the manufacturing execution system of FIG. 3, in accordance with one embodiment of the present invention.

Referring now to FIG. 5, the MES 310 identifies (at 510) tasks (e.g., process tasks) that are to be completed by the processing tool 105. The fault detection and process control unit 122 determines (at 520) which of the identified tasks (at 510) the processing tool 105 is capable of completing based on the determined impact (at 440—see FIG. 4) on the processing tool 105. The business rules module 330 prioritizes (at 530) the tasks that the processing tool 105 is capable of completing according to one or more business rules. The fault detection and processing unit 122 controls (at 540) the processing tool 105 according to the prioritization of the tasks based on the business rules.

One or more embodiments of the present invention allow the processing tool 105 to operate in a degraded mode upon detection of one or more faults. The fault detection and process control unit 122 provides selected tasks to the processing tool 105 that it is capable of completing in the degraded mode. As such, instead of shutting down the processing tool 105 is response to detecting a fault, the fault detection and process control unit 122 is able to efficiently utilize at least some of the capabilities of the processing tool 105 to achieve a greater throughput.

The various system layers, routines, or modules may be executable by the control units 121 and 123 (see FIG. 1). As utilized herein, the term "control unit" may include a microprocessor, a microcontroller, a digital signal processor, a processor card (including one or more microprocessors or controllers), or other control or computing devices. The storage units 124 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   detecting a fault associated with a processing tool capable of processing one or more workpieces; and
   operating the processing tool in a degraded mode in response to detecting the fault and in accordance with one or more business rules.

2. The method of claim 1, wherein detecting the fault comprises detecting at least one of a processing fault and a operational fault associated with the processing tool.

3. The method of claim 1, further comprising detecting a plurality of faults associated with the processing tool.

4. The method of claim 3, wherein operating the processing tool comprises prioritizing the plurality of faults according to a priority scheme.

5. The method of claim 4, wherein prioritizing the faults comprises assigning a higher priority to a fault resulting in a greater functional impact to the processing tool relative to another fault that results in a lesser functional impact to the processing tool.

6. The method of claim 1, wherein operating the processing tool comprises determining one or more functions that the processing tool is capable of performing after an occurrence of the fault.

7. The method of claim 1, wherein operating the processing tool comprises determining one or more tasks to be completed and performing at least one of the tasks based on determining that the processing tool is capable of performing the at least one of the tasks after the occurrence of the fault.

8. The method of claim 1, wherein detecting the fault comprises determining the fault based on comparing operational data received from the processing tool to fault model data.

9. The method of claim 1, wherein detecting the fault comprises:
  receiving data associated with the processing tool; and
  detecting, using a fault detection unit, the fault associated with the processing tool based on the received data.

10. The method of claim 1, wherein operating the processing tool in accordance with the one or more business rules comprises operating the processing tool in accordance with a business need of an entity.

11. The method of claim 1, Wherein operating the processing tool in accordance with the one or more business rules comprises identifying a product among a plurality of products to process and processing at least a portion of the identified product using the processing tool.

12. An apparatus, comprising:
  an interface; and a control unit communicatively coupled to the interface, the control unit adapted to:
    detect an occurrence of a fault in a processing tool capable of processing a workpiece;
    determine at least one function that the processing tool is capable of performing after the occurrence of the fault; and
    indicate to the processing tool to perform the determined function in accordance with one or more business rules.

13. The apparatus of claim 12, wherein the control unit is adapted to detect at least one of a processing fault and operational fault associated with the processing tool.

14. The apparatus of claim 12, wherein the control unit is adapted to detect a plurality of faults associated with the processing tool.

15. The apparatus of claim 14, wherein the control unit is adapted to prioritize the plurality of faults according to a level of functional impact the plurality of faults have on the processing tool.

16. The apparatus of claim 12, wherein the control unit is adapted to determine the at least one function based on selecting a task that requires the at least one function for completion.

17. The apparatus of claim 16, wherein the control unit is adapted to select the task based on a business rule designating the task as a higher priority than other tasks.

18. The apparatus of claim 12, wherein the control unit is adapted to determine the fault based on comparing operational data received from the processing tool to fault model data.

19. The apparatus of claim 12, wherein the control unit is adapted to:
  receive data associated with the processing tool; and
  detect, using a fault detection unit, the fault associated with the processing tool based on the received data.

20. The apparatus of claim 12, wherein the control unit is adapted to operate the processing tool in accordance with the one or more business rules that prioritize one or more tasks based on a business need of an entity.

21. An article comprising one or more machine-readable storage media containing instructions that when executed enable a processor to:
  detect a fault associated with a processing tool capable of processing one or more workpieces;
  determine at least one function that the processing tool is capable of performing based on detected fault; and
  cause the processing tool to perform the determined function in accordance with one or more business rules.

22. The article of claim 21, wherein the instructions when executed enable the processor to detect a plurality of faults associated with the processing tool.

23. The article of claim 22, wherein the instructions when executed enable the processor to prioritize the plurality of faults according to a level of functional impact the plurality of faults have on the processing tool.

24. The article of claim 21, wherein the instructions when executed enable the processor to determine the at least one function based on selecting a task that requires the at least one function for completion.

25. The article of claim 24, wherein the instructions when executed enable the processor to select the task based on a business rule designating the task as a higher priority than other tasks.

26. The article of claim 21, wherein the instructions when executed enable the processor to detect at least one of a processing fault and operational fault associated with the processing tool.

27. The article of claim 21, wherein the instructions when executed enable the processor to: receive data associated with the processing tool; and detect, using a fault detection unit, the fault associated with the processing tool based on the received data.

28. A system, comprising:
  at least one processing tool; and
  a control unit communicatively coupled to the processing tool, the control unit adapted to:
    detect a fault in the processing tool;
    determine at least one function that the processing tool is capable of performing based on the detected fault; and
    indicate to the processing tool to perform the determined function in accordance with one or more business rules.

29. The system of claim 23 wherein the control unit is communicatively coupled to the processing tool over an advanced process control framework.

30. An apparatus, comprising:
  means for detecting a fault associated with a processing tool capable processing one or more workpieces; and
  means for operating the processing tool in a degraded mode in response to detecting the fault and in accordance with one or more business rules.

* * * * *

UNITED STATES PATENT AND TRADEMARK OFFICE
CERTIFICATE OF CORRECTION

PATENT NO. : 6,763,278 B1
APPLICATION NO. : 10/133045
DATED : July 13, 2004
INVENTOR(S) : Elfido Coss, Jr., Michael R. Conboy and Sam H. Allen, Jr.

It is certified that error appears in the above-identified patent and that said Letters Patent is hereby corrected as shown below:

In column 2, line 36, replace "inventions" with --invention--.

In claim 11, column 11, line 11, replace "Wherein" with --wherein--.

In claim 29, column 12, line 46, replace "23" with --28--.

In claim 30, column 12, line 51, replace "capable processing" with --capable of processing--.

Signed and Sealed this

Twenty-sixth Day of June, 2007

JON W. DUDAS
*Director of the United States Patent and Trademark Office*